F. J. BULLOCK.
KNIFE SUPPORT FOR CUTTING WHEELS.
APPLICATION FILED APR. 5, 1916.
1,236,259.
Patented Aug. 7, 1917.
2 SHEETS—SHEET 1.
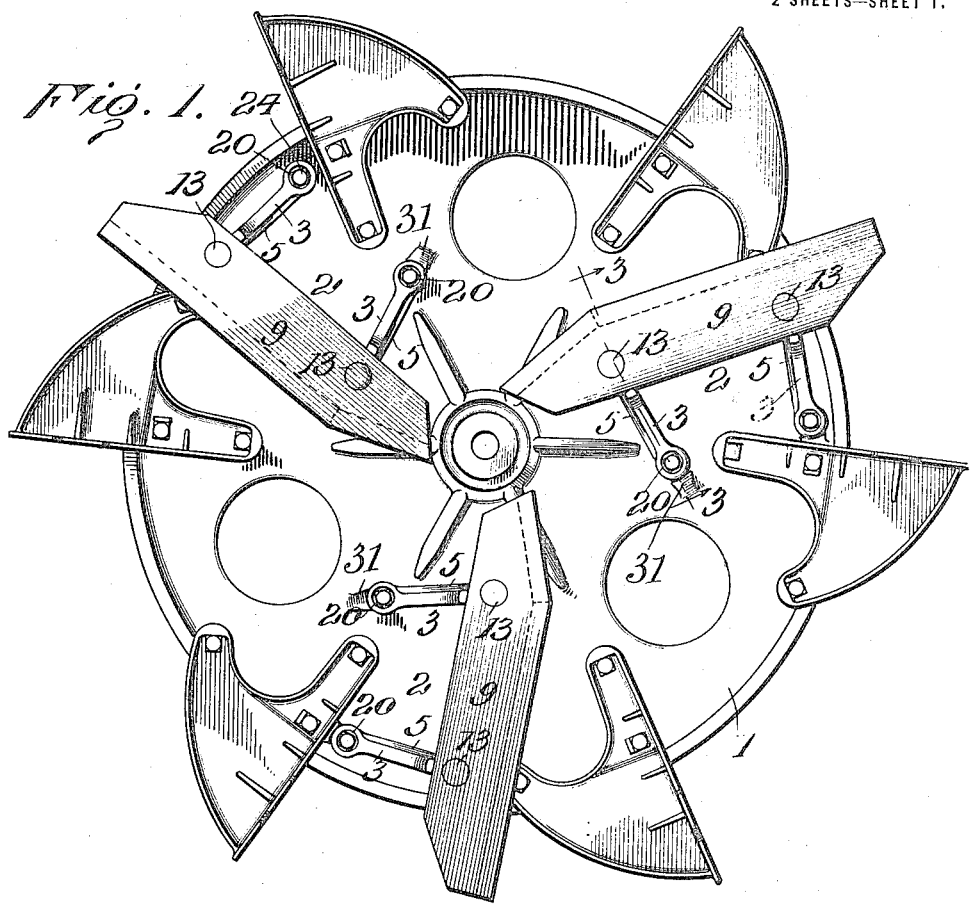
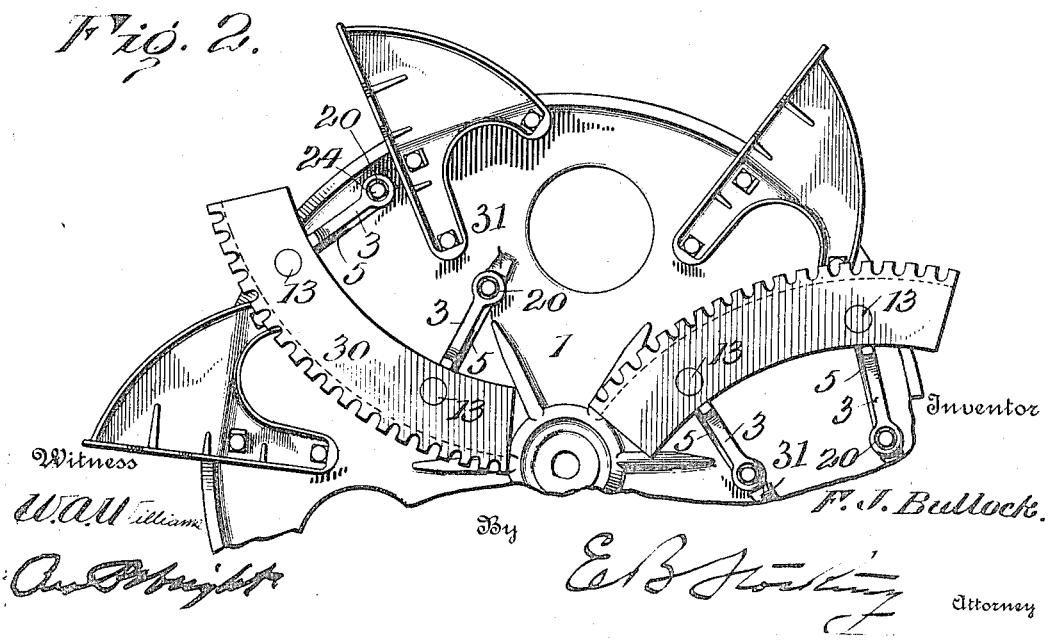

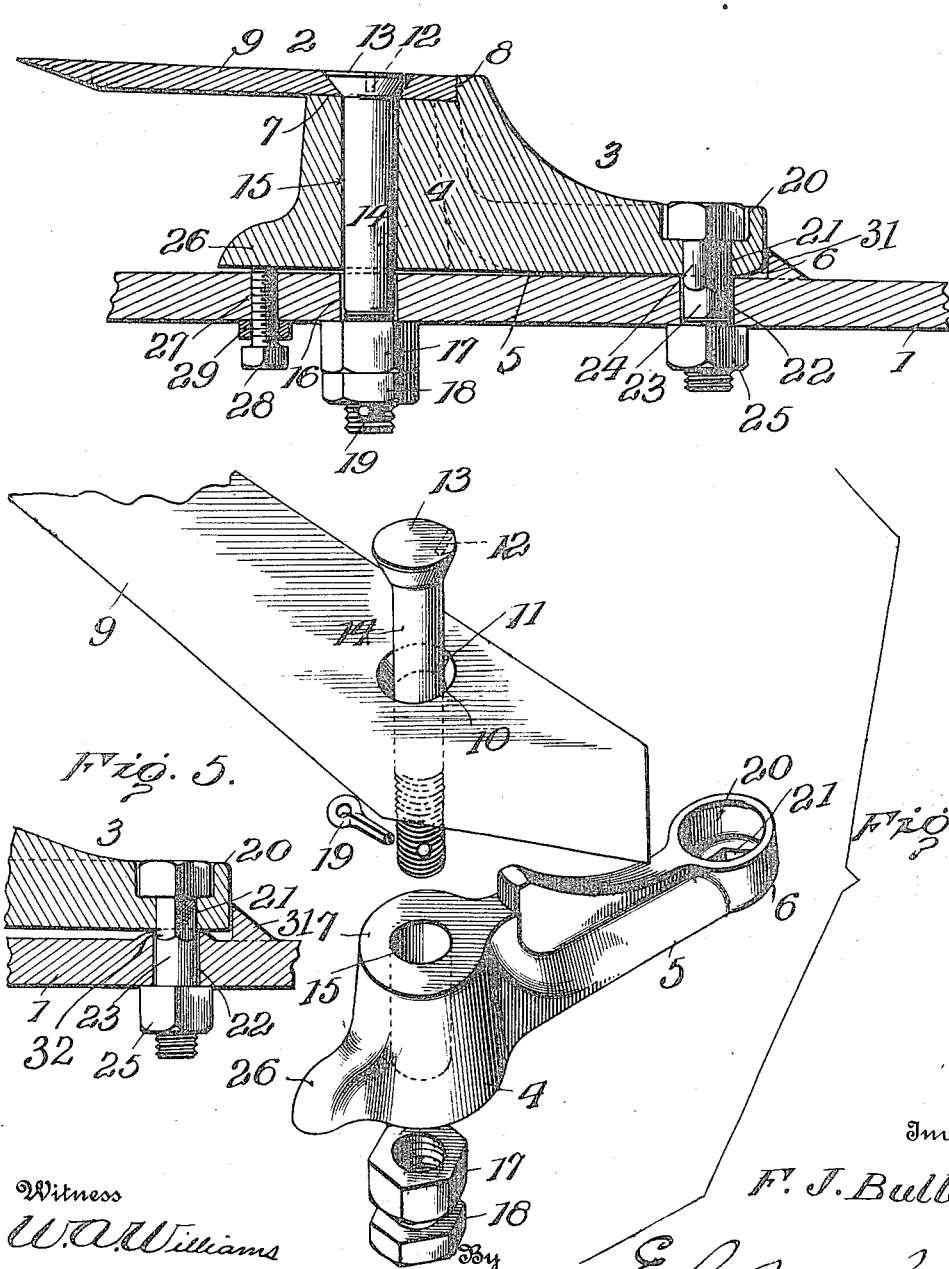

UNITED STATES PATENT OFFICE.

FRED J. BULLOCK, OF SHORTSVILLE, NEW YORK, ASSIGNOR TO PAPEC MACHINE COMPANY, OF SHORTSVILLE, NEW YORK, A CORPORATION OF NEW YORK.

KNIFE-SUPPORT FOR CUTTING-WHEELS.

1,236,259.　　　Specification of Letters Patent.　　Patented Aug. 7, 1917.

Application filed April 5, 1916.　Serial No. 89,145.

*To all whom it may concern:*

Be it known that I, FRED J. BULLOCK, a citizen of the United States, residing at Shortsville, in the county of Ontario and State of New York, have invented certain new and useful Improvements in Knife-Supports for Cutting-Wheels, of which the following is a specification, reference being had therein to the accompanying drawings.

This invention relates to certain new and useful improvements in knife supports for cutting wheels used in ensilage cutters, the object being to provide a support which will hold the tangentially arranged knife securely in position on the cutting wheel and in such a manner that the knife can be positively and quickly adjusted in respect to the shear plate.

Another and further object of the invention is to provide a knife support in which two bolts are employed in connection with each support for fastening the knives and two bolts for adjusting the knives so as to insure the knives being held in their adjusted positions in such a manner that they cannot possibly work loose when the wheel is in operation.

Another and further object of the invention is to provide a knife support which can be readily attached to a cutter wheel carrying fan blades and one which is so constructed that the knives mounted upon said support will be held rigid, in their adjusted positions.

Other and further objects and advantages of the invention will be hereinafter set forth and the novel features thereof defined by the appended claims.

In the drawings—

Figure 1, is a plan view of a cutting wheel showing the application of my improved knife supports thereto, three cutting knives being shown arranged tangentially thereon;

Fig. 2, is a plan view of a portion of a cutting wheel showing a curved knife arranged upon the supports;

Fig. 3, is a section taken on the line 3—3 of Fig. 1; and

Fig. 4, is a perspective of one of the knife supports and connecting bolts showing the knife in position to be secured on said support.

Fig. 5 is a detail section through a cutter wheel and a knife support showing the face of the cutter wheel provided with a rounded boss in order to allow the support to rock to adjust the same.

Like numerals of reference refer to like parts in the several figures of the drawings.

In carrying out my invention, I employ a cutting wheel 1 preferably formed of semi-steel having a heavy steel tire shrunk around the peripheral edge thereof, said wheel being provided with the usual fan blades; the above description being given so that the manner of mounting the cutting blades on the wheel can be readily understood, when used in connection with a cutting wheel employing fan blades.

In Fig. 1 of the drawings, I have shown the cutting wheel provided with three straight knives, 2, each knife being supported by a pair of supports 3 which are formed exactly alike and a description of one of these supports will be sufficient for all.

The support 3, is preferably formed of a casting and comprises a body portion 4 having a flat base 5 which terminates at one end in a rounded portion 6 as clearly shown in Fig. 3, so that when the support is arranged upon the face of the cutting wheel 1, the same can be rocked as will be hereinafter fully described.

The body portion of the support 3 is provided with an inclined seat 7 terminating at a shoulder 8 on which a knife 9 is adapted to be placed so that the knife will be held obliquely in respect to the cutting wheel 1.

The knife 9 as shown in Figs. 1, 3 and 4, is what is known as a straight knife and is provided with an opening 10 adjacent each end, the wall of said openings being reamed and having a notch 11 to receive a key 12 projecting from the head 13 of a bolt 14 which is counter-sunk within the blade, as shown in Fig. 3.

The body portion 4 is provided with a vertical bore 15 to receive the bolt 14 which bolt passes through an opening 16 formed in the wheel 1 and mounted upon the threaded end of the bolt is a nut 17 and a lock nut 18 said nuts being held in position upon the bolt by a cotter pin 19 passing through the bolt.

The reduced portion of the body which terminates at the rounded portion 6, is provided with a socket 20 having a square opening 21 in its bottom which is adapted to register with an opening 22 formed in the wheel 1 through which is adapted to pass a bolt 23 which is provided with a square portion 24 fitting within the square opening 21 so as to prevent the bolt from turning, the head of the bolt being seated within the socket 20, as clearly shown in Fig. 3. The bolt is locked in position by an ordinary nut 25.

The body portion 4 of the support has a lip 26 projecting outwardly therefrom opposite to the reduced portion and the wheel has a threaded opening 27 formed therein under said lip, in which a threaded bolt 28 is mounted adapted to engage the lip so as to force the body portion away from the wheel in order to adjust the knife in respect to the shear plate, said bolt being held in its adjusted position by a lock nut 29.

It will be seen that I have provided a knife support which comprises a body portion having a lip projecting therefrom and a reduced portion which terminates in a rounded portion and is provided with a socket and opening to receive a bolt for fastening the same in position upon the cutting wheel.

In adjusting the knife in respect to the shear plate, when mounted upon a pair of supports, as herein shown and described, it will be seen that by loosening the nuts on the bolt 14 and by operating the bolt 28 so as to throw the end thereof into engagement with the lip 26 the support will be rocked upon the rounded portion 6 of the reduced portion so as to throw the knife toward the shear plate.

In this construction of support, it will be seen that two bolts are employed for holding the support and knife in position upon the cutting wheel, one of said bolts also serving the purpose of adjusting the knives in connection with the adjusting bolt so that in reality, two bolts fasten the knives in position upon the cutter wheel and two bolts adjust the knives in position upon the cutter wheel. This is obtained by providing a pair of supports for each cutting knife so that each support is adjusted by an adjusting bolt whereby the supports can be quickly and positively adjusted so as to position the knives in respect to the shear plate or in respect to the face of the cutting wheel which is mounted within the casing at a set distance from the shear plate.

In Fig. 2, I have shown the supports 3 carrying curved knives 30 secured on the cutter wheel 1 and provided with serrated edges to form shredding knives although it is, of course, clearly understood that the ordinary knife having a beveled cutting edge is adapted to be used in connection with this form of mount and I do not wish to limit myself to any particular construction or design of knife to be used in connection with these supports.

The face of the cutting wheel is provided with stop lugs 31, adjacent the openings 22 so as to provide means for relieving the thrusts on the bolts employed for securing the knife supports to the wheel.

In the modification shown in Fig. 5, the wheel 1 is provided with a rounded boss 32 upon which the support is mounted at one end so as to allow the opposite end of the same to be adjusted in order to throw the knife into the proper position in respect to the shear plate. In this construction it will be seen that the face of the wheel is provided with a rounded portion instead of forming the rounded portion on the end of the support, as I have found the same result can be accomplished by mounting the support on the wheel in either of these manners.

From the foregoing description, it will be seen that I have provided a knife support for a cutting wheel used in ensilage cutters in which each tangentially arranged knife is mounted upon two supports arranged upon the face of the wheel so as to hold the knife at the proper angle and the proper distance from the shear plate and in such a manner that the knives can be adjusted in respect to the shear plate and locked in their adjusted position in a rigid manner.

I claim:

1. In a knife support, the combination with a wheel, of a supporting member mounted on the face of the wheel having a rounded reduced portion, a bolt extending through said reduced portion and wheel, said support having an inclined seat, a knife mounted upon said seat, a bolt extending through said knife, support and wheel, and an adjusting bolt mounted in said wheel engaging said support for rocking said support upon the rounded portion thereof.

2. In a cutting wheel, the combination with a pair of spaced supports having rounded under surfaces at their ends, of a cutting knife mounted upon said supports, means carried by said wheel engaging said supports for rocking said supports upon said wheel for adjusting said knives in respect to the face of said wheel, and means extending outwardly from said wheel engaging said support.

3. In a knife support for cutting wheels, the combination with a cutting wheel having openings formed therein, of supports arranged on said wheel over said openings, said supports having rounded end portions, bolts extending through said rounded end portions for securing said support on the face of the wheel, said supports being provided with seats, a knife mounted on the seats of said supports, bolts extending through said knife, supports and wheel, said wheel having threaded openings under said supports, and adjusting bolts mounted in said threaded openings for rocking said supports upon the rounded ends thereof.

4. A knife support for cutting wheels, comprising a body having a reduced portion terminating in a rounded portion forming a pivoted bearing for said support, spaced means for connecting said support to said wheel, a stop lug extending outwardly from the face of said wheel engaging the rounded end of said support, and means disposed at the opposite end of said support for adjusting the position of said support in respect to said wheel.

5. In a cutting wheel for ensilage cutters, the combination with a wheel having a series of spaced openings, of supports mounted on said wheel over said openings having rounded under end portions, bolts passing through said supports secured in said openings, and adjusting bolts carried by said wheel engaging said supports for rocking said supports on the rounded portions thereof for adjusting the position of said supports in respect to said wheel.

6. In a cutting wheel, a knife support comprising a body portion having a reduced portion extending therefrom provided with a socket having an opening in its bottom, a bolt having a head seated in said socket extending through said wheel, said body having an inclined seat on the top thereof provided with an opening extending through the body thereof, a knife mounted upon said seat, a bolt extending through said knife, support and wheel, a lip projecting from said body portion, and an adjusting bolt mounted in said wheel engaging said lip.

7. A cutting wheel, having a series of tangentially arranged pairs of supports mounted thereon, each support being secured to the wheel by spaced bolts, one end of each support being rounded, and adjusting bolts mounted within said wheels engaging the opposite end of said supports for rocking said supports upon the rounded ends thereof.

8. In a knife support for cutting wheels, the combination with a cutting wheel, of a supporting member mounted upon the face of said wheel having a body portion with a seat on the face thereof for the blade, said member having a reduced portion extending from said body portion having a socket and provided with a rounded portion, a bolt having its head seated in said socket for securing said reduced portion to said wheel, a bolt passing through the body portion for securing a knife within said seat and the body to said wheel, and an adjusting bolt mounted within said wheel engaging said support for rocking said support upon the rounded portion thereof.

9. In a knife support for cutting wheels, the combination with a cutting wheel, of spaced supports mounted upon one face of said wheel having rounded portions at one end and provided with lips projecting from the opposite ends, a knife mounted upon said supports, bolts passing through said knife and supports, bolts for securing the rounded ends of said supports to said wheel, and adjusting bolts mounted within said wheel engaging the lips of said supports for adjusting said knife in respect to the face of said wheel.

10. In a knife support for cutting wheels, the combination with a wheel having two series of openings arranged tangentially, of a support arranged over each series of openings, said support having an inclined seat, a knife mounted in said seat, a bolt extending through said knife and support and one of the openings of said wheel, a bolt for fastening the opposite end of said support, and an adjusting bolt mounted in the other opening of said wheel for rocking said support.

11. A cutting wheel for ensilage cutters having a rounded bearing, a knife support mounted on said bearing at one end, means disposed at the opposite end of said knife support for rocking said support upon said bearing, and a stop extending from the face of said wheel adapted to engage the end of said knife support.

12. In a cutting wheel for ensilage cutters, a knife support having a rounded bearing on its under surface at one end, means for securing said end to the face of said wheel, means disposed at the opposite end of said support for rocking said support upon said bearing, a knife carried by said support, and a bolt for securing said knife upon said support and said support upon said wheel.

In testimony whereof I hereunto affix my signature in the presence of two witnesses.

FRED J. BULLOCK.

Witnesses:
E. D. MATHER,
WILLIS C. ELLIS.

Copies of this patent may be obtained for five cents each, by addressing the "Commissioner of Patents, Washington, D. C."